United States Patent [19]

Khare et al.

[11] Patent Number: 5,344,805
[45] Date of Patent: Sep. 6, 1994

[54] PLATINUM AND TIN-CONTAINING CATALYST AND USE THEREOF IN ALKANE DEHYDROGENATION

[75] Inventors: Gyanesh P. Khare; Randall A. Porter, both of Bartlesville, Okla.

[73] Assignee: Phillips Petroleum Company, Bartlesville, Okla.

[21] Appl. No.: 55,343

[22] Filed: May 3, 1993

[51] Int. Cl.⁵ .......................... B01J 23/06; B01J 23/42
[52] U.S. Cl. ..................................... 502/329; 502/170; 502/225; 502/334; 502/342; 502/352; 585/660
[58] Field of Search ............... 502/169, 170, 224, 325, 502/329, 334, 339, 342, 352; 585/660

[56] References Cited

U.S. PATENT DOCUMENTS

| | | | |
|---|---|---|---|
| 3,674,706 | 7/1972 | Box, Jr. et al. | 252/412 |
| 3,692,701 | 9/1972 | Box, Jr. | 252/466 B |
| 4,131,536 | 12/1978 | Adams et al. | 208/139 |
| 4,159,939 | 7/1979 | Antos | 208/139 |
| 4,167,496 | 9/1979 | Antos et al. | 252/466 B |
| 4,331,822 | 5/1982 | Onodera et al. | 585/482 |
| 4,366,091 | 12/1982 | Antos | 252/466 PT |
| 4,738,941 | 4/1988 | Dufresne et al. | 502/66 |
| 4,786,625 | 11/1988 | Imai et al. | 502/326 |
| 4,827,072 | 5/1989 | Imai et al. | 585/443 |
| 5,012,027 | 4/1991 | Abrevaya et al. | 585/443 |
| 5,143,888 | 9/1992 | Olbrich | 502/329 |

*Primary Examiner*—Anthony McFarlane
*Attorney, Agent, or Firm*—K. K. Brandes

[57] ABSTRACT

In a process for preparing a dehydrogenation catalyst of the type in which a support comprising zinc aluminate is impregnated with at least one of platinum and tin from an impregnation solution, the improvement comprises simultaneously impregnating the support with the platinum and the tin by contacting the support with an impregnation solution which comprises, in solution, a tin compound, a platinum compound, and a carboxylic acid. The thus prepared catalyst can be employed in the dehydrogenation of at least one alkane containing 2–8 carbon atoms per molecule in the presence of steam.

13 Claims, No Drawings

PLATINUM AND TIN-CONTAINING CATALYST AND USE THEREOF IN ALKANE DEHYDROGENATION

BACKGROUND OF THE INVENTION

According to one aspect, this invention relates to a catalyst comprising platinum and tin on a zinc aluminate-containing support, and according to other aspects relates to a novel process for making such catalyst and use of the catalyst in alkane dehydrogenation.

In the preparation of dehydrogenation catalysts comprising platinum and tin on a zinc aluminate-containing support, it is known to impregnate the support with platinum and/or tin by contacting such support with an impregnation solution having at least one of a platinum compound or tin compound dissolved therein. However, improvement in such dehydrogenation catalysts with respect to activity (i.e. conversion), selectivity to olefins, and rate of deactivation would be desirable.

SUMMARY OF THE INVENTION

It is, therefore, an object of the invention to provide a dehydrogenation catalyst comprising a zinc aluminate-containing support which is impregnated with platinum and/or tin from an impregnation solution, and which demonstrates improved performance in the dehydrogenation of alkanes with respect to activity, selectivity to olefins (particularly monoolefins), and rate of deactivation.

The above objects are realized by the various aspects of the invention described below.

According to one aspect, in a process for preparing a dehydrogenation catalyst of the type in which a support comprising zinc aluminate is impregnated with at least one of platinum and tin from an impregnation solution, the improvement comprises simultaneously impregnating the support with the platinum and the tin by contacting the support with an impregnation solution which comprises, in solution, a tin compound, a platinum compound, and a carboxylic acid.

According to other aspects of the invention, there is provided a dehydrogenation catalyst produced according to the above-described process, and also a process of using such catalyst in the dehydrogenation of at least one alkane containing 2-8 carbon atoms per molecule, in the presence of steam, to at least one alkene.

It is shown in a subsequent example that a dehydrogenation catalyst prepared in accordance with the invention demonstrates, in the dehydrogenation of an alkane, higher activity, higher selectivity to olefins (particularly monoolefins), and a slower rate of deactivation than comparative catalysts produced in accordance with prior art processes.

DETAILED DESCRIPTION OF THE INVENTION

In the presently preferred method of preparing the zinc aluminate-containing support, the zinc aluminate is prepared by a method comprising mixing (preferably dry-mixing in a suitable mill) appropriate amounts (preferably approximately equimolar amounts) of zinc oxide and alumina, adding water or a dilute aqueous acid solution such as a dilute acetic acid solution while mixing is continued, drying the resulting wet mixture (preferably at about 150°–250° C.), and then calcining (preferably by heating in air) the dried mixture at a sufficiently high temperature (preferably at about 750°–1200° C., more preferably about 750°–1000° C.) for a sufficient length of time (preferably about 1–10 hours) to form zinc aluminate. The alumina employed can be in any suitable form, such as hydrated or flame-hydrolyzed, but is preferably hydrated alumina and most preferably an a lumina monohydrate such as boehmite or pseudoboehmite. Various other additives, such as graphite and/or calcium aluminate, can also be present during the mixing step. The inclusion of calcium aluminate in the support is particularly preferred. The time required for thorough dry-mixing and subsequent mixing with the water or aqueous acid solution depends on the particular mixing equipment, amounts of ingredients to be mixed, and other operating parameters. The above-described dried mixture can be appropriately moistened with water and then extruded, tabletted, granulated, or processed to any other suitable form prior to calcining. A suitable lubricant such as zinc stearate can be employed, if desired, in such processing of the dried mixture.

After preparation of the support, such support is simultaneously impregnated with platinum and tin by contacting the support with an impregnation solution comprising at least a platinum compound, a tin compound, and a carboxylic acid. This contacting step can be carried out in any suitable manner, such as by spraying the support with the impregnation solution or by immersing the support in the impregnation solution a sufficient time so that substantially all of the platinum and tin in solution diffuses into the support. When spraying the support, it is typical to employ a volume of impregnation solution which is approximately equivalent to the pore volume of the support, preferably followed by a suitable "aging" period of about 0.1–24 hours, more preferably about 0.25–1 hour, to allow substantially all of the platinum and tin in solution to diffuse into the support. Where the support is immersed in impregnation solution, it is typical to employ a volume of solution which is about 1–2 times the volume of support being impregnated.

As to the composition of the impregnation solution, such solution comprises, as mentioned above, a platinum compound, a tin compound, and a carboxylic acid in solution, and preferably further comprises an inorganic acid. Most preferably, the impregnation solution is an aqueous solution consisting essentially of water, the platinum compound, the tin compound, the carboxylic acid, and the inorganic acid. The preferred weight percentages of the platinum of the platinum compound, the tin of the tin compound, the carboxylic acid, and the inorganic acid are as follows, respectively, based on the weight of the support: preferably about 0.05–5 weight percent, and most preferably 0.1–1 weight percent of the platinum; preferably about 0.1–5 weight percent, and most preferably 0.5–2 weight percent of the tin; preferably about 1–30 weight percent, most preferably 5–20 weight percent of the carboxylic acid; and preferably about 0.1–10 weight percent, and most preferably 1–5 weight percent of the inorganic acid. The concentrations of the platinum compound, tin compound, the carboxylic acid, and the inorganic acid as present in a suitable solvent, such as water, are not particularly critical as long as such components remain in solution and are present in the desired amounts relative to the weight of the support.

Any platinum compound capable of impregnating the support with platinum from the impregnation solution can be employed in accordance with the invention. Suitable platinum compounds include platinum chloride, chloroplatinic acid, ammonium chloroplatinate, platinum diammine oxalate, and platinum tetrammine chloride. Chloroplatinic acid is particularly preferred.

Any tin compound capable of impregnating the support with tin from the impregnation solution can be employed in accordance with the invention. Suitable tin compounds include tin halides, nitrates, oxalates, acetates, oxides, and hydroxides. Tin halides are preferred, and stannous chloride is particularly preferred.

The carboxylic acid is defined herein and in the appended claims as any organic acid having at least one terminal carboxyl (COOH) group. Preferred carboxylic acids include oxalic acid, formic acid, acetic acid, citric acid, and succinic acid. Oxalic acid is particularly preferred.

Suitable inorganic acids include, for example, hydrochloric acid, nitric acid, sulfuric acid, hydrofluoric acid, and phosphoric acid. Hydrochloric acid is most preferred.

The various components of the impregnation solution can be mixed together in any sequence in accordance with certain broad aspects of the invention, but it is most preferred to form the impregnation solution from the combination of (i) a first solution comprising the platinum compound and the carboxylic acid and (ii) a second solution comprising the tin compound and the inorganic acid. Each of the first and second solutions are preferably aqueous solutions. It is also preferred to heat the resulting impregnation solution to a temperature of about 20° C.-90° C., most preferably about 40° C.-60° C., immediately prior to impregnation of the support in order to facilitate dissolving of the various components and also to facilitate diffusion of the platinum and tin into the support.

Following impregnation, the impregnated support is preferably dried at a temperature of about 80°-250° C., followed by calcining in an oxygen-containing atmosphere (i.e. air) at a temperature of about 400°-600° C. The resulting calcined catalyst is then preferably washed with water to remove any ions (i.e. chloride), and is subsequently dried again.

The catalyst produced as described above generally contains the following components in the specified weight percentages as based on the weight of the catalyst: about 80–98 weight percent zinc aluminate; about 0.05–5 weight percent platinum; about 0.1–5 weight percent tin; and according to a preferred embodiment, about 1–20 weight percent calcium aluminate. It is understood that additional components which are beneficial for catalyzing the dehydrogenation of alkanes may also be present in small amounts, such as Re, Au, Ag, alkali metal, Ce, and the like. Generally, the surface area of the catalyst is in the range of from about 5 to about 100 m$^2$/g. The catalyst particles can have any suitable size and shape, such as cylindrical, spherical, granules, or trilobal.

Any suitable alkane containing 2–8 carbon atoms per molecule can be used as feed in the dehydrogenation process of this invention such as, for example, ethane, propane, n-butane, isobutane, n-pentane, isopentane, and mixtures thereof. Particularly preferred is isopentane.

The operating conditions of alkane dehydrogenation are well known. Steam is present to alleviate coke deposition on the catalyst, to enhance feed conversion, and to retard catalyst deactivation. The reaction temperature is considerably higher than the normal boiling temperature (measured at 1 atm.) of the feed alkane, and is generally in the range of about 500° C.–650° C., preferably about 560°–610° C. The molar ratio of steam to the alkane(s) in the vaporized feed is generally in the range of from about 0.5:1 to about 30:1, preferably from about 2:1 to about 10:1. The pressure is generally in the range of from about 0 to about 200 psig, and preferably about 20 to about 100 psig.

In the dehydrogenation process, steam and vaporized alkane, preferably premixed at the desired molar ratio, ere generally preheated and passed through the dehydrogenation reactor (or a train of two or more reactors in series or in parallel) containing a fixed bed of the catalyst. The gas hourly space velocity of the vaporized alkane feed (excluding steam) in the dehydrogenation process is generally in the range of from about 100 to about 10,000 cc alkane per cc catalyst per hour, preferably from about 500 to about 2,000 cc/cc/hour. The flow rate of steam is determined by the desired molar ratio of steam to alkane feed. Free oxygen is substantially absent during the dehydrogenation since $O_2$ causes the formation of higher amounts of undesirable carbon oxides (CO and/or $CO_2$) during the process.

During the dehydrogenation process, the catalyst loses some of its catalytic activity, in part because of coke formation on the catalyst surface. When the catalytic activity has dropped below an effective level (generally after about 6–30 hours on stream), the flow of the alkane-containing feed is cut off, and a purge of gas comprising steam and/or an inert gas (e.g., $N_2$, Ar, He) is passed through the hot catalyst bed (at a temperature of about 500°–650° C., for about 1–60 minutes), so as to substantially remove hydrocarbons from the reactor. Subsequently, the catalyst is regenerated, preferably by treating the catalyst for a suitable time with a free oxygen-containing gas, preferably a stream of steam-diluted air. Generally, the regeneration temperature is in the range of from about 450° to about 750° C., and the molar ratio of steam to free oxygen is in the range of from about 20:1 to about 200:1. The pressure during regeneration is generally about 0–200 psig, preferably about 20–100 psig. The duration of regeneration depends on the regeneration conditions and on the amount of coke deposits to be removed. Generally, regeneration is carried out for about 0.1 to about 5 hours, preferably about 0.2 to about 1 hour. Thereafter, the reactor is purged again with a gas comprising steam and/or an inert gas (to sweep out $O_2$), the flow of the alkane feed is resumed, and the dehydrogenation is carried out with the regenerated catalyst composition until catalyst regeneration is again required.

The product mixture of the dehydrogenation process comprises primarily monoolefins (alkenes). By-products include CO, $C_2$, paraffins, and diolefins. When isopentane is used as feed, primarily $C_5$ monoolefins, such as 3-methylbutene-1, 2-methylbutene-1, 2-methylbutene-2, are formed. The thus formed monoolefinic hydrocarbons can be recovered after having been separated from other components of the product mixture of the dehydrogenation process by any suitable means, e.g., by fractional distillation, absorption/desorption processes, or membrane separation techniques. Unreacted feed, after it has been substantially separated from other product mixture components, can be recycled to the dehydrogenation reactor which contains the catalyst.

It is understood that reasonable modifications and variations of the invention can be made without departing from the scope of this invention.

An example will now be described to further illustrate the invention, but which should not be construed to limit the invention in any manner.

EXAMPLE

The purpose of this example is to compare dehydrogenation results obtained with three separate catalysts (Catalysts A, B, and C) which were prepared employing different preparation processes. Catalysts A and B are comparative catalysts and Catalyst C is an invention catalyst. Preparation of such catalysts are described below.

Catalyst A (Comparative—incorporation of tin into support material and subsequent impregnation of support with platinum from aqueous solution containing platinum compound): 939 g of a boehmite alumina (Vista Chemical Company, Houston, Tex., under the product designation "Dispal"), 597 g of zinc oxide (Zinc Corporation of America, Monaca, Pa.), 19.5 g of stannic oxide (Harshaw Chemical Co., Cleveland, Ohio), and 150 g of calcium aluminate (Secar 71 Cement, from LaFarge Calcium Aluminates, Chesapeake, Va.) were dry mixed in a mix muller for 10 minutes. To the dry mixture was added 825 mL, of an aqueous 1 volume percent acetic acid solution over a period of 3 minutes while mixing was continued. The resulting paste was dried at 200° C. overnight in a Blue M circulating air oven. The dried material was ground, sieved through a 30 mesh screen, and the fraction which passed through the screen was sprayed with sufficient water to bring the moisture level to about 10–11 weight percent, as based on the total weight of the thus moistened material. 34 g of zinc stearate was blended with the resulting material, followed by tabletting in a tabletting machine, equipped with dies to make $\frac{1}{8}" \times \frac{1}{8}"$ tablets, at a pressure of about 140 lb.

Thereafter, the tablets were calcined in air for 5 hours at 843° C. after having ramped to 843° C. over about 6 hours. An aqueous impregnation solution of chloroplatinic acid, having a platinum content sufficient to deposit about 0.6 weight percent (as based on total weight of catalyst) of platinum on the support, was sprayed onto the calcined tablets. Coating of the calcined tablets with impregnation solution was facilitated by spraying such tablets while in a mixer that is rotated about its longitudinal axis at an acute angle with respect to vertical. The thus impregnated tablets were dried in air at 150° C. for 3 hours and then calcined in flowing air at 525° C. for 3 hours after having ramped to the 525° C. temperature at a rate of 2° C./minute. In order to substantially remove chloride ions from the resulting calcined catalyst, the catalyst was washed for 3 hours in water at a temperature of 82°–99° C., followed by drying in air at 150° C. for 3 hours to result in the final catalyst. Such catalyst contained about 0.6 weight percent platinum and about 1 weight percent tin, as based on the total weight of the catalyst.

Catalyst B (Comparative—simultaneous impregnation of support with platinum and tin from an aqueous solution containing a platinum compound, a tin compound, and an inorganic acid): In preparation of a first batch of support tablets, 597 g of zinc oxide (described above), 939 g of boehmite alumina (described above), and 150 g of less than 30 mesh calcium aluminate (described above) were dry mixed in a mix-muller for 10 minutes. To the dry mixture was slowly added 825 mL of an aqueous 1 volume percent acetic acid solution over a period of 15 minutes while mixing was continued. Thereafter, 30 g of high purity graphite (KS-44 graphite from Lonza Inc., Fairlawn, N.J.) was added, with mixing, over a period of 15 minutes. The resulting paste was dried at 200° C. overnight in a Blue M circulating air oven. The dried material was ground, sieved through a 30 mesh sieve, and the resulting fraction of less than 30 mesh was sprayed with sufficient water to bring the moisture content up to 10.51 weight percent, as based on the total weight of the thus moistened material. The resulting moist material was tabletted in the manner described for Catalyst A, and then calcined in air in a muffle furnace at 843° C. for 5 hours after having ramped to 843° C. over about 6 hours.

A second batch of support tablets was prepared in the same manner as the first batch, except that the material resulting from grinding and sieving was sprayed with sufficient water to bring the moisture content up to 10.01 weight percent instead of 10.51 weight percent. Such second batch was mixed with the first batch of support tablets to result in a blended batch of support tablets. 210 g of such blended batch of support tablets were then dried in air at 150° C. for 2 hours. 100 g of such dried support tablets were employed to produce Catalyst B as described below.

A first solution was prepared by dissolving 1.58 g of chloroplatinic acid crystals in 25 mL of water. A second solution was prepared by dissolving 1.92 g of hydrated stannous chloride ($SnCl_2.2H_2O$) in 3.0 mL of concentrated hydrochloric acid (aqueous solution containing about 37 weight percent HCl). The thus prepared first and second solutions were mixed and heated to 50° C. to result in the desired impregnation solution. The above-mentioned 100 g of support tablets were sprayed with the impregnation solution in the same general manner as described for Catalyst A to result in impregnated tablets which were allowed to age at room temperature for about 30 minutes. The impregnated tablets were then dried in air overnight at 150° C., followed by calcining in flowing air in accordance with the following schedule: ramp from ambient temperature to 149° C. at 2° C./minute and hold at 149° C. for 1 hour; ramp from 149° C. to 266° C. at 2° C./minute and hold at 266° C. for 2 hours; ramp from 266° C. to 524° C. at 2° C./minute and hold at 524° C. for 5 hours; and allowing cooling to room temperature over about 3–4 hours. Chloride ions were substantially removed from the resulting calcined catalyst by washing with 15 gallons of water over a 6 hour period, followed by drying overnight in air at 150° C. to result in the final catalyst. Such catalyst contained about 0.6 weight percent platinum and about 1 weight percent tin, as based on the total weight of the catalyst.

Catalyst C (Invention—simultaneous impregnation of support with platinum and tin from aqueous solution containing a platinum compound, a tin compound, a carboxylic acid, and an inorganic acid): 100 g of support tablets, from the blended batch described above, were employed to prepare this catalyst in the same manner as described for Catalyst B, except that the first solution was prepared by dissolving 15 g of oxalic acid in 25 mL of water, adding 1.58 g of chloroplatinic acid crystals, and then heating to 80° C. to facilitate dissolving of oxalic acid in the water. Such first solution was mixed with the second solution to result in the impregnation solution in the same manner as described for Catalyst B, followed by the remaining steps of catalyst preparation which were also identical to those described for Catalyst B. The final Catalyst C contained about 0.6 weight percent platinum and about 1 weight percent tin, as based on the total weight of the catalyst.

Dehydrogenation Runs—Each of Catalysts A, B, and C were employed in the dehydrogenation of isopentane in a laboratory reactor having a length of about 1 foot and a diameter of about 1 inch. With respect to each catalyst, the reactor was loaded with multiple layers of material including a catalyst layer (6.0 g) about 1-1½ inches high, an upper layer of alumina about 5-6 inches high above the catalyst layer, and a lower layer of alumina about 1 inch high below the catalyst layer.

Liquid isopentane was vaporized and introduced into the reactor at a flow rate of 24 cc/hour, and superheated steam was introduced into the reactor at a flow rate of 25.2 cc/hour to provide an isopentane/steam mixture having a steam to isopentane molar ratio of 6:1. Other process conditions included a catalyst bed temperature of 580° C. and a reactor pressure of 50 psia. The exiting product gas was analyzed by means of a gas chromatograph.

Dehydrogenation runs for each catalyst were carried out in a cyclic, continuous flow process with intermediate air regeneration, where each cycle consisted of the following steps at the above-described temperature and pressure: a regeneration step consisting of flushing of the catalyst with nitrogen for 15 minutes at a flow rate of about 125 cc/minute, passing air for at least 60 minutes at a flow rate of 125 cc/minute over the catalyst, and then another 15 minute nitrogen purge of the catalyst; and then a conversion or dehydrogenation step of passing the isopentane/steam mixture through the reactor and catalyst for about 7 hours. Three such cycles were carried out with each catalyst.

Conversion and selectivity results for Catalyst A, B, and C are set forth in Table I. Converted products for each catalyst included primarily $C_5$ monoolefins such as 3-methylbutene-1, 2-methylbutene-1, and 2-methylbutene-2, but also included small amounts of by-products such as carbon monoxide, carbon dioxide, paraffins, and diolefins. Conversion in Table I is given in terms of mole percent of the feed (isopentane), and selectivities are given in terms of mole percent of the converted feed. Data is provided in Table I for each of the three cycles for product collected at 1.25 hour and 4.25 hours into the conversion (dehydrogenation) step of each respective cycle. An average of data at 1.25 and 4.25 hours is also provided.

TABLE I

Dehydrogenation of Isopentane Using Catalysts A, B, and C

| | Conversion (mole %) | | | Selectivity to Olefins (mole %) | | | Selectivity to Monoolefins (mole %) | | |
|---|---|---|---|---|---|---|---|---|---|
| | A | B | C | A | B | C | A | B | C |
| Cycle 1 | | | | | | | | | |
| 1.25 hr. | NM[a] | 31.9 | 55.1 | NM | 80.6 | 91.9 | NM | 70.5 | 84.0 |
| 4.25 hr. | NM | 25.2 | 49.1 | NM | 82.1 | 90.7 | NM | 68.6 | 79.9 |
| Average | NM | 28.8 | 51.7 | NM | 81.0 | 91.4 | NM | 68.8 | 82.3 |
| Cycle 2 | | | | | | | | | |
| 1.25 hr. | 53.0 | 41.0 | 56.8 | 88.2 | 83.1 | 91.5 | 80.6 | 73.9 | 83.5 |
| 4.25 hr. | 41.3 | 31.0 | 47.3 | 88.7 | 85.6 | 91.6 | 79.2 | 72.9 | 82.7 |
| Average | 46.7 | 35.8 | 52.5 | 88.5 | 84.3 | 91.3 | 80.1 | 73.2 | 82.7 |
| Cycle 3 | | | | | | | | | |
| 1.25 hr. | 56.7 | 34.6 | 60.2 | 88.7 | 84.6 | 93.0 | 81.1 | 74.1 | 85.1 |
| 4.25 hr. | 45.0 | 26.6 | 50.0 | 89.4 | 85.1 | 91.7 | 80.7 | 70.0 | 82.5 |
| Average | 50.8 | 30.7 | 55.0 | 89.1 | 84.1 | 91.8 | 81.0 | 71.5 | 83.2 |

[a]NM means no measured.

It can be seen from Table I that Catalyst C, in accordance with the invention, provided consistently higher conversion, higher selectivity to olefins, and higher selectivity to monoolefins than comparative Catalysts A and B in the dehydrogenation of isopentane.

Set forth in Table II Is the decrease (%) in conversion from the conversion percentage at 1.25 hr. to the conversion percentage at 4.25 hr. for each of the catalysts and their respective cycles. Calculation of this decrease in conversion provides a good indication of the rate of deactivation of the catalyst during the dehydrogenation step of a particular cycle.

TABLE II

Decrease in Conversion for Catalysts A, B, and C in Cycles 1, 2, and 3

| | Conversion Decrease (%) | | |
|---|---|---|---|
| Cycle | A | B | C |
| 1 | ND[a] | 21 | 11 |
| 2 | 22 | 24 | 17 |
| 3 | 21 | 23 | 17 |

[a]ND means not determined due to lack of data.

It can be seen from Table II that conversion decreased to a lesser extent in each cycle for Catalyst C as compared to Catalysts A and B, indicating a desirably slower rate of deactivation for Catalyst C.

That which is claimed is:

1. In a process for preparing a dehydrogenation catalyst comprising the step of impregnating a support comprising zinc aluminate with platinum and tin from an impregnation solution, the improvement which comprises contacting the support with an impregnation solution which has been formed by combining a first solution consisting essentially of water, a platinum compound and oxalic acid and a second solution consisting essentially of water, a tin compound and an inorganic acid.

2. A process as recited in claim 1 wherein the inorganic acid is hydrochloric acid.

3. A process as recited in claim 1 wherein the platinum compound is chloroplatinic acid and the tin compound is stannous chloride.

4. A process as recited in claim 1 wherein platinum of the platinum compound, tin of the tin compound, oxalic acid, and the inorganic acid are present in said impregnating solution in the following weight percentages as based on the weight of the support: about 0.05–5 weight percent of platinum; about 0.1–5 weight percent of tin; about 1–30 weight percent of oxalic acid; and about 0.1–10 weight percent of the inorganic acid.

5. A process as recited in claim 4 wherein the support further comprises calcium aluminate.

6. A dehydrogenation catalyst produced in accordance with claim 1.

7. A dehydrogenation catalyst produced in accordance with claim 4.

8. A dehydrogenation catalyst produced in accordance with claim 5.

9. A process in accordance with claim 1 comprising the additional steps of drying the support which has been contacted with said impregnating solution, and calcining the thus-obtained dried, impregnated support in an oxygen-containing atmosphere at a temperature of about 400°–600° C.

10. A process in accordance with claim 9 wherein said drying is carried out at a temperature of about 80°–250° C.

11. A process in accordance with claim 9 further comprising the steps of washing the calcined, impregnated support obtained by the process of claim 9 with water so as to remove chloride ions therefrom, and then drying the thus-obtained washed catalyst material.

12. A process in accordance with claim 5, wherein said dehydrogenation catalyst contains about 80–98 weight percent zinc aluminate, about 0.05–5 weight percent platinum, about 0.1–5 weight percent tin, and about 1–20 weight percent calcium aluminate.

13. A dehydrogenation catalyst produced in accordance with claim 12.

* * * * *